United States Patent
Long

(10) Patent No.: US 6,282,014 B1
(45) Date of Patent: Aug. 28, 2001

(54) CASCADE OPTICAL PARAMETRIC OSCILLATOR FOR DOWN-CONVERSION

(75) Inventor: William Harrison Long, Torrance, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 09/328,698

(22) Filed: Jun. 9, 1999

(51) Int. Cl.$^7$ ........................................ G02F 1/39
(52) U.S. Cl. ................................ 359/330; 359/326
(58) Field of Search .......................... 359/326–332; 372/21, 22; 385/122

(56) References Cited

U.S. PATENT DOCUMENTS

| | | | |
|---|---|---|---|
| 3,530,301 | 9/1970 | Boyd et al. | 307/88.3 |
| 3,609,389 | 9/1971 | Bjorkholm | 307/88.3 |
| 3,617,918 | 11/1971 | Rabin | 330/4.3 |
| 3,617,936 | 11/1971 | Bjorkholm | 331/175 |
| 3,619,637 | 11/1971 | Goto | 307/88.3 |

(List continued on next page.)

*Primary Examiner*—John D. Lee
(74) *Attorney, Agent, or Firm*—Terry J. Anderson; Karl J. Hoch, Jr.

(57) ABSTRACT

The present invention comprises an optical parametric oscillator for down-conversion of coherent light to longer wavelengths. The present invention comprises an optical pump source for providing a pump beam at a primary wavelength. The pump source is coupled into a singly-resonant cavity through an input mirror positioned at the input end of said cavity. The inputed pump beam is directed into a monolithic non-linear optical medium having multiple regions formed on a single substrate. An optical parametric oscillation occurs at each stage of the optical medium; however, the signal (resonated) frequency is identical at each stage of the optical medium. The single frequency produced at each stage of the optical medium results in a sequential gain of the signal, which is resonated by an output mirror which is adapted to reflect and oscillate the signal frequency within the cavity, and allow the idler frequency to pass through the cavity.

12 Claims, 2 Drawing Sheets

U.S. PATENT DOCUMENTS

| | | | |
|---|---|---|---|
| 3,628,186 | 12/1971 | Ashkin et al. | 331/107 R |
| 3,824,717 | 7/1974 | Evtuhov et al. | 307/88.3 |
| 3,965,375 | 6/1976 | Bergman, Jr. et al. | 307/88.3 |
| 3,983,406 | 9/1976 | Lax et al. | 307/88.3 |
| 4,180,751 | 12/1979 | Ammann | 307/428 |
| 4,639,923 | 1/1987 | Tang et al. | 372/21 |
| 4,731,787 | 3/1988 | Fan et al. | 372/22 |
| 4,809,291 | 2/1989 | Byer et al. | 372/75 |
| 4,884,277 | 11/1989 | Anthon et al. | 372/22 |
| 4,897,562 | 1/1990 | Krasinski | 307/427 |
| 4,907,238 | 3/1990 | Chun et al. | 372/32 |
| 4,965,803 | 10/1990 | Esterowitz et al. | 372/5 |
| 4,992,750 | 2/1991 | Stewart | 330/4.3 |
| 5,027,361 | 6/1991 | Kozlovsky et al. | 372/22 |
| 5,033,057 | 7/1991 | Bosenberg et al. | 372/72 |
| 5,038,352 | 8/1991 | Lenth et al. | 372/21 |
| 5,047,668 | 9/1991 | Bosenberg | 359/330 |
| 5,065,046 | 11/1991 | Guyer | 359/330 |
| 5,068,546 | 11/1991 | Hemmerich et al. | 359/328 |
| 5,070,260 | 12/1991 | Wong | 359/330 |
| 5,079,445 | 1/1992 | Guyer | 359/330 |
| 5,117,126 | 5/1992 | Geiger | 359/330 |
| 5,134,622 | 7/1992 | Deacon | 372/21 |
| 5,144,630 | 9/1992 | Lin | 372/22 |
| 5,151,909 | 9/1992 | Davenport et al. | 372/22 |
| 5,159,487 | 10/1992 | Geiger et al. | 359/330 |
| 5,177,633 * | 1/1993 | Wong | 359/330 |
| 5,179,562 | 1/1993 | Marason et al. | 372/22 |
| 5,191,587 | 3/1993 | Hanson et al. | 372/21 |
| 5,195,104 | 3/1993 | Geiger et al. | 372/97 |
| 5,206,868 | 4/1993 | Deacon | 372/21 |
| 5,227,911 | 7/1993 | Schiller et al. | 359/222 |
| 5,233,462 | 8/1993 | Wong | 359/330 |
| 5,243,612 | 9/1993 | Udagawa et al. | 372/22 |
| 5,276,548 | 1/1994 | Margalith | 359/330 |
| 5,289,491 | 2/1994 | Dixon | 372/92 |
| 5,291,503 | 3/1994 | Geiger et al. | 372/21 |
| 5,297,156 | 3/1994 | Deacon | 372/21 |
| 5,355,247 | 10/1994 | Byer et al. | 359/330 |
| 5,365,539 | 11/1994 | Mooradian | 372/75 |
| 5,377,219 | 12/1994 | Geiger | 372/97 |
| 5,400,173 | 3/1995 | Komine | 359/330 |
| 5,412,674 | 5/1995 | Scheps | 372/22 |
| 5,483,374 | 1/1996 | Tanuma | 359/328 |
| 5,500,865 | 3/1996 | Chakmakjian et al. | 372/22 |
| 5,530,711 | 6/1996 | Scheps | 372/20 |
| 5,561,550 | 10/1996 | Tanuma | 359/330 |
| 5,579,152 | 11/1996 | Ellingson et al. | 359/330 |
| 5,583,877 | 12/1996 | MacPherson et al. | 372/4 |
| 5,606,453 | 2/1997 | Walling et al. | 359/330 |
| 5,608,744 | 3/1997 | Hovis et al. | 372/21 |
| 5,619,517 | 4/1997 | Dixon | 372/21 |
| 5,640,405 | 6/1997 | Wallace et al. | 372/21 |
| 5,663,973 * | 9/1997 | Stamm et al. | 359/330 X |
| 5,673,281 | 9/1997 | Byer | 372/3 |
| 5,675,594 | 10/1997 | Hovis et al. | 372/22 |
| 5,682,397 | 10/1997 | Scheps | 372/22 |
| 5,696,778 | 12/1997 | MacPherson | 372/4 |
| 5,696,782 | 12/1997 | Harter et al. | 372/25 |
| 5,740,190 | 4/1998 | Moulton | 372/23 |
| 5,754,333 | 5/1998 | Fulbert et al. | 359/330 |
| 5,768,302 | 6/1998 | Wallace et al. | 372/21 |
| 6,016,214 * | 1/2000 | Meyer, Jr. et al. | 359/330 X |
| 6,101,023 * | 8/2000 | Meyer, Jr. et al. | 359/330 |
| 6,167,067 * | 12/2000 | Meyer, Jr. et al. | 372/21 |

* cited by examiner

CASCADE OPTICAL PARAMETRIC OSCILLATOR FOR DOWN-CONVERSION

FIELD OF THE INVENTION

The present invention relates generally to the field of optical devices, and particularly to embodiments of a cascaded optical parametric oscillator. The optical parametric oscillator includes an optical medium with multiple non-linear regions to facilitate efficient down-conversion of coherent light to longer wavelengths.

BACKGROUND OF THE INVENTION

Production of tunable coherent radiation through parametric amplification from a fixed frequency laser beam is effected through a device known as an optical parametric oscillator (OPO). The theoretical rationale and complexities associated with parametric amplification and OPOs are well known to those skilled in the art.

In a conventional OPO, the OPO receives a beam of laser radiation at a pump frequency $\omega_p$ from a pump source. The pump frequency $\omega_p$ is received into a resonant optical cavity, wherein pump frequency $\omega_p$ is directed through a non-linear medium, usually a crystal, located within the resonant cavity. As a result, two lower energy signals are generated from the pump beam, which are known as the signal, at frequency us and the idler at frequency $\omega_i$.

The content and orientation of the crystal and the design of the resonant cavity determines the signal $\omega_s$ and idler $\omega_i$ frequencies. The feedback within the resonant cavity causes gain in the parametric waves, a process similar to build-up in a laser cavity. The cavity can either be singly-resonant in which end mirrors reflect only signal frequency $\omega_s$, or doubly-resonant in which end mirrors reflect both signal $\omega_s$ and idler $\omega_i$ frequencies. End mirrors of the OPO are transparent to the pump frequency $\omega_p$. OPOs with singly-resonant cavities are typically more stable in their output than OPOs with doubly-resonant cavities.

Due to the nature of the non-linear crystal and the conversion process, the pump frequency $\omega_p$ is always higher than the frequency of the signal $\omega_s$ and the idler $\omega_i$. The sum of the signal $\omega_s$ and idler $\omega_i$ frequencies is equal to the pump frequency $\omega_p$.

Power and energy conversion efficiency to the idler frequency $\omega_i$ in an OPO is limited by the quantum efficiency and photon efficiency. Since idler frequency $\omega_i$ is less than half of the pump frequency $\omega_p$, the quantum limit is always less than one half and significantly less so when the idler frequency wi is far from degeneracy. Furthermore, for pulsed OPOs, pump regeneration from signal $\omega_s$ and idler $\omega_p$ frequency reduces photon conversion efficiency due to temporally and/or spatially varying pump radiation. Nevertheless, idler output provides a useful means of generating coherent radiation in spectral regions that are difficult to access by other sources.

There are a variety of types of crystals that may be used in OPOs for various spectral regions. In particular, non-linear optical crystals capable of producing parametric output which have been developed for commercial applications, include, but are not limited to, potassium titanyl phosphate (KTP), potassium titanyl arsenate (KTA), lithium niobate (LiNbO$_3$), potassium niobate (KNbO$_3$), silver gallium selenide (AgGaSe$_2$), and silver gallium sulfide (AgGaS$_2$). When a fixed laser is used to generate tunable waves from certain crystals, an electric field may be applied to the crystal, or the crystal may be temperature or angle tuned, or a combination of electrical voltage, temperature and/or angle tuning is required to achieve phase matching.

Periodically poled LiNbO$_3$ (PPLN) has been shown to be particularly well-suited for OPO wavelength generation in the 1.4–4.0 μm region due to its low threshold, large non-linear coefficient, large acceptance angle, absence of walk-off, and transparency in this region (L. E. Myers, R. C. Eckardt, M. M. Fejer, R. L. Byer, W. R. Bosenberg, and J. W. Pierce, J. Opt. Soc. Am. B12, 2102–2116 (1995)). Although continuous wave OPOs utilizing PPLN have demonstrated high conversion efficiencies (W. R. Bosenberg, A. Drobshoff, J. I. Alexander, L. E. Myers, and R. L. Byer, Opt.Lett. 21, 1336–1338 (1996)), typically pulsed OPOs have not yet approached continuous wave OPO efficiencies due to factors such as back conversion of the pump wave and non-uniform pump depletion.

In a typical configuration of an OPO using a crystal or PPLN medium, the crystal or PPLN is located between the two cavity mirrors. Light is directed through the entry mirror through the crystal or PPLN medium and through the exit mirror with certain frequencies being reflected back into the cavity to again be transmitted through the crystal or PPLN medium.

Other techniques of increasing conversion efficiency in similar OPO configurations suggest the inclusion of a second crystal or PPLN medium located within the cavity, and situated between the two cavity mirrors. In these structures, an entry mirror receives the light which directs the beam through a first crystal or PPLN to be received by a second crystal or PPLN and then on to an exit mirror. Again, the exit mirror transmits certain frequencies while reflecting other frequencies back through the crystal media.

Conversion schemes using tandem and intercavity difference frequency mixing (DFM) OPOs have been proposed and analyzed (K. Koch, G. T. Moore, and E. C. Cheung, J. Opt, Soc. Am. B 12, 2268–2273 (1995); and G. T. Moore and K. Koch, IEEE J. Quantum Electron. 32, 2085–2094 (1996)) and may help mitigate some of the limitations inherent in pulsed OPOs, however, such suggested approaches fail to significantly increase conversion efficiency.

Frequency conversion schemes utilizing multiple crystals within the OPO cavity demonstrating the OPO-DFM system applying two separate PPLN crystals are discussed and analyzed in J. M. Fukumoto, H. Komine, W. H. Long et al. Advanced Solid State Lasers (1998) (Optical Society of America, Washington, D.C., 1998), post deadline paper PDP-4, where a factor of two increase in the idler conversion efficiency is demonstrated.

Reference may be had to the following patents for further information concerning the state of the technology relating to OPOs (all of the references are incorporated herein by reference):

U.S. Pat. No. 5,400,173, issued Mar. 21, 1995 entitled "Tunable Mid-Infrared Wavelength Converter Using Cascaded Parametric Oscillators" to Komine, describes an apparatus for converting a fixed wavelength pump into a plurality of spectral output beams. The first resonator is coupled to a first non-linear optical crystal for turning said pump into a first and second output beams.

U.S. Pat. No. 5,500,865, issued Mar. 19, 1996 entitled "Phased Cascading Of Multiple Non-linear Optical Elements For Frequency Conversion", to Chakmakjian, uses two or more crystals in tandem to increase the interaction length of the non-linear optical process for improved efficiency. Additional optical components are inserted into the optical path to adjust the phase delay of the interacting waves in order to maintain coherent generation of the product radiation.

U.S. Pat. No. 4,639,923, issued Jan. 27, 1987, entitled, "Optical Parametric Oscillator Using Urea Crystal", to Tang, et al., uses a crystal of urea as the non-linear optical medium for constructing an OPO.

U.S. Pat. No. 5,159,487, issued Oct. 27, 1992, entitled "Optical Parametric Oscillator OPO Having A Variable Line Narrowed Output", to Geiger et al., describes an OPO that includes a pump laser for producing a pump beam; an optical resonator; an OPO crystal disposed within the optical resonator aligned with and responsive to the pump beam to produce a parametrically generated output; and a device external to the optical resonator for line narrowing the parametrically generated output.

U.S. Pat. No. 5,144,630, issued Sep. 1, 1992, entitled "Multiwavelength Solid State Laser Using Frequency Conversion Technique", to Lin, describes an apparatus for producing multiwavelength coherent radiations ranging from deep ultraviolet to mid-infrared. The basic laser is a pulsed Nd:YAG or Nd:YLF laser which is frequency converted by a set of novel non-linear crystals including D-CDA, LBO, BBO, KTP and $KNbO_3$ where efficient schemes using noncritical phase matching and cylindrical focussing are employed.

U.S. Pat. No. 5,117,126, issued May 26, 1992, entitled "Stacked Optical Parametric Oscillator", to Geiger, describes a stacked OPO wherein two optical parametric crystals are coaxially disposed in a single resonator, Incident radiation is coupled to the resonator and causes parametric oscillations of the two crystals. The two crystals are independently tuned, such as by angular orientation to produce distinct components of secondary radiation.

U.S. Pat. No. 5,079,445, issued Jan. 7, 1992, entitled "High Output Coupling Cavity Design For Optical Parametric Oscillators", to Guyer, discloses a cavity design for use with a non-linear medium which may be used as an oscillator using pump energy with frequency (FP) interacting with the non-linear medium for parametrically generating outputs having a signal frequency (FS) and an idler frequency (FI). The parametric radiation which is produced satisfies the relationship which is common for optical parametric amplifiers and oscillators, FP=FS+FI.

U.S. Pat. No. 5,070,260, issued Dec. 3, 1991, entitled "Ultrahigh-Resolution Optical Parametric Oscillator Frequency Measurement and Synthesis System", to Wong, discloses one or more OPOs which are arranged selectively, singly, serially, and/or in parallel and each OPO is responsive to an input pump beam having a fractional stability to produce output signals and idler beams having fractional stabilities that correspond to or are better than the fractional stability of the pump beam and in such a way that the sum of the frequencies of the output signal and idler beams of each OPO is constrained to be equal to the frequency of the input beam thereof.

U.S. Pat. No. 5,047,668, issued Sep. 10, 1991, entitled "Optical Walkoff Compensation In Critically PhaseMatched Three-Wave Frequency Conversion Systems". to Bosenberg, discloses a walkoff-compensation frequency conversion system such as an OPO including a pair of non-linear crystals such as: Beta-Barium Metaborate, aligned in an optical cavity with their optical axis at an angle with respect to the axis of the cavity.

U.S. Pat. No. 4,884,277, issued Nov. 28, 1989, to Anthon, et al., discloses an intracavity frequency-modified laser of improved amplitude stability which is obtained through the use of a plurality of non-linear optical crystals within the laser cavity.

The efficiency for down-conversion in an OPO is limited by reversion of the generated waves back into the pump. Unlike up-conversion, such as second harmonic generation, where the efficiency increases monotonically as the pump intensity is increased and is limited only by material damage, in a parametric oscillator the conversion process is reversible. As the power in the signal and idler waves approaches that of the incident pump wave, the pump field amplitude can be driven through zero and begin to grow again in magnitude at the expense of the longer wavelengths.

As a result of this back-conversion, the efficiency of an OPO goes through a maximum as the pump intensity, or gain, is increased. If the pump is a continuous plane wave, the maximum photon efficiency is 100 percent at $(\pi/2)^2=2.5$ times threshold. However, for a pulsed Gaussian beam, the efficiency depends on the ratio of the pulse length to the cavity length. For a pulse length (FWHM) equal to 40 cavity round-trip (RT) times, the maximum efficiency is 29% at about 2 times threshold.

For conversion to a single wavelength, the photon efficiency must be multiplied by the quantum efficiency, or the ratio of the pump wavelength to the desired wavelength. This is because in a conventional OPO, each pump photon produces one signal photon and one idler photon. If the wavelength of the selected photon is much longer than the pump, then the quantum efficiency is low. If the signal and idler are equal, then the OPO is degenerate and the net efficiency is doubled, but now the device is no longer tunable for a fixed pump wavelength.

One way to reduce back-conversion and improve the efficiency of the OPO is to reflect the pump wave back into the medium after its first pass (Care must be taken not to allow any idler feedback). In this way, not only is the small signal gain doubled (reducing build-up time), but back-conversion to the pump is reduced as the second pass must generate its own idler from zero. For the case quoted above (FWHM=40RT), the efficiency increases from a maximum of 29% to 52% at about 2.5 times threshold.

Conversion efficiency to the signal wave can be further improved by dividing the crystal into multiple segments and rejecting the idler at each break. Since the signal and pump must repeatedly generate new idler, the back-conversion process is minimized. With this approach, depletion of the pump is nearly complete and conversion to the signal approaches the quantum limit at high gains.

Other conversion schemes propose a signal (resonated) wave which is limited by a non-linear output coupler. When the signal exceeds some level, the effective output coupling increases to clamp the field of the resonating wave at a nearly constant value. The non-linear output coupler is basically another parametric medium within the OPO cavity which is tuned to convert the signal wave to the idler wavelength and a new wavelength which is the difference of the signal and idler.

It is evident that it would be desirable to overcome the disadvantages of the stated art by providing an apparatus that allows for the efficient down conversion of coherent light to longer wavelengths.

SUMMARY OF THE INVENTION

It is therefore the object of the present invention to provide a technique for efficient down-conversion of coherent light to longer wavelengths. The method involves an optical parametric oscillator (OPO) with multiple non-linear regions, each phase-matched for a single down-conversion step. The signal wavelength determines the fixed frequency step and successive idler waves each feed power into the resonated signal wave. The conversion efficiency in such a device is very high and can approach 100 percent if the pump wave is also resonated.

The present invention relates to embodiments of an optical parametric oscillator used for down-conversion of coherent light to longer wavelengths. More specifically, the present invention comprises an optical pump source for providing a pump beam at a primary wavelength. The pump source is coupled into a singly-resonant cavity having an input end and an output end. A monolithic non-linear optical medium is disposed in said cavity. The monolithic non-linear optical medium is separated into several stages which are formed on a single substrate. An optical parametric oscillation occurs in each stage of the optical medium however, at each stage the produced signal frequency is identical. The output idler wave of each stage is used as a pump source for each successive stage.

An input mirror positioned at the input of said cavity couples the pump beam into the resonator cavity and through the monolithic non-linear optical medium. The input mirror is adapted to reflect the signal frequency while allowing passage of other frequencies. An output mirror is positioned at the output end of the cavity, and is also adapted to couple the idler frequency, and other frequencies out of the cavity, and is further adapted to partially reflect the signal frequency back into the resonator cavity.

In the preferred embodiment, each stage of the optical parametric oscillator is phase-matched. Other embodiments may include PPLN crystals which are periodically poled for each stage. In this approach, quasi-phase-matching is accomplished through the switching of the sign of the phase-mismatch k-vector once every coherence length. Or, each said region may consist of alternately oriented crystals, one coherence length thick for achieving quasi-phase-matching. Alternatively, the crystals may be thermally and/or angle-tuned to achieve continuous phase-matching.

Possible embodiments of the present invention include a 3-stage optical parametric oscillator. In one such embodiment, an optical pump source provides a pump beam at 1.064 $\mu$m. The 1.064 $\mu$m pump beam is coupled to the singly-resonant cavity at the input end through an input mirror, which directs the beam into the monolithic non-linear optical medium. The non-linear optical medium comprises three regions formed on a single substrate for sustaining optical parametric oscillation by producing identical resonating signal waves at a frequency of 4.0 $\mu$m and a resultant idler wave at each stage of the optical medium resulting in sequential gain of the 4.0 $\mu$m resonated signal. The input mirror and output mirrors are adapted to reflect the signal frequency within the resonator cavity while allowing other signals to pass through the cavity.

A third embodiment of the present invention comprises an optical parametric oscillator for down-conversion of coherent light to longer wavelengths wherein the monolithic non-linear optical medium has seven separate regions. An optical pump source provides a pump beam at 1.064 $\mu$m. The beam is coupled through an input mirror positioned at the entrance to a singly-resonant cavity and is directed through the monolithic non-linear optical medium. The monolithic non-liner optical medium disposed within the cavity comprises seven regions formed on a single substrate for sustaining optical parametric oscillation by producing an identical resonated signal frequency of 8.5 $\mu$m. The identical production of the signal at each stage of the optical medium results in sequential gain of the resonated signal. Both the input and output mirrors are adapted to reflect and to oscillate a signal frequency within the resonator cavity while allowing other signals to pass through the cavity.

It should be noted and understood that with respect to the present invention, the material suggested may be modified or substituted to achieve the general overall resultant, i.e., high efficiency. The substitution of materials or dimensions remain within the spirit and scope of the present invention.

DETAILED DESCRIPTION OF THE PREFERRED EMBODIMENTS

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

The cascade OPO of the present invention combines some aspects of each of the techniques described in the background of the invention to reduce back-conversion and maximize overall efficiency to a given wavelength. The present invention suppresses the idler by converting it to a signal (resonant wave) in multiple steps. The signal is the desired wavelength, and, since it is resonated, its mode structure and temporal characteristics can be controlled. The number of steps, and the resulting signal wavelength, is limited only by the transparency of the medium.

Figure 1:
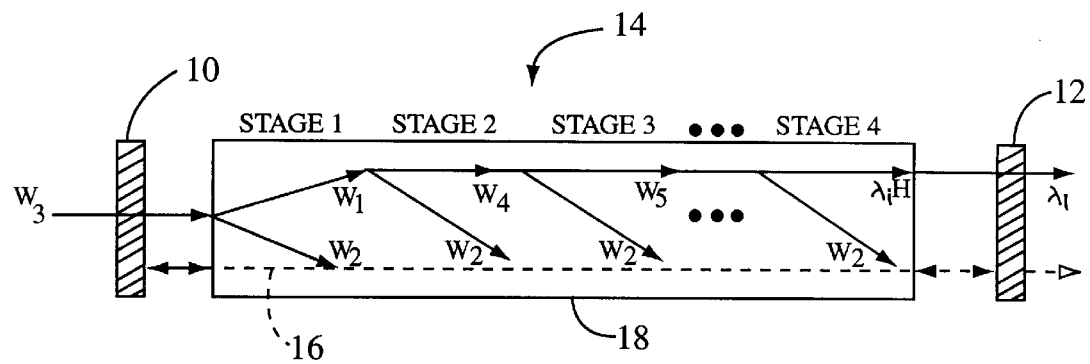
FIG. 1 is a graphical representation of an n-stage cascaded optical parametric oscillator of the present invention.

Referring particularly to FIG. 1, there is shown an n-stage cascade optical parametric oscillator of the present invention. The present invention comprises an input mirror 10 and an output mirror 12. An optical pump source (not shown) provides a pump beam $\omega_3$ at a primary wavelength. A singly-resonant cavity 14 is formed by the input mirror 10 and the output mirror 12. Input mirror 10 and the output mirror 12 are transparent to the pump beam $\omega_3$ and any resultant idler wave. The resonated wave is the signal frequency $\omega_2$ which is reflected by the input mirror 10 and partially reflected by the output mirror 12. The signal is shown in FIG. 1 as $\omega_2$ and is shown as being resonated along the path 16. Located between the input mirror 10 and output mirror 12 within the singly-resonant cavity 14 is a non-linear optical medium 18. In FIG. 1, there is shown an n-stage cascade optical parametric oscillator which is separated into multiple stages. In this regard, as the pump beam $\omega_3$ passes through stage 1, a idler beam $\omega_1$ and signal beam $\omega_2$ are created ($\omega_3=\omega_2+\omega_1$). Because $\omega_2$ is resonated within the cavity, it passes through the remainder of the non-linear optical medium and is reflected and resonated within the cavity 14 by mirrors 10 and 12.

The resultant idler wave $\omega_1$ is then passed through stage 2 of the non-linear optical medium 18 and is separated into further components as idler wave $\omega_4$ and resonated wave $\omega_2$ ($\omega_1=\omega_4+\omega_2$). Likewise, $\omega_4$ is passed through stage 3 wherein idler wave $\omega_5$ and signal wave $\omega_2$ are produced ($\omega_4=\omega_5+\omega_2$). In this regard, each successive idler wave passed through the various stages may be further separated as successive idler waves pass through each stage of the non-linear optical medium 18 provided that the idler wave is shorter in wavelength than the resonated signal wave $\omega_2$.

The non-linear medium 18 has multiple regions or stages which are each phase-matched for a single step in the cascade process. Stage 1 converts the pump $\omega_3$ to the desired longer wavelength $\omega_2$ and an idler wave $\omega_1$. Stage 2 is phase-matched to convert the idler $\omega_1$ from stage 1 to the desired wavelength and a second idler $\omega_2$, and so on. The process is continued until the last idler wavelength is longer than the signal $\omega_2$. The cavity 14 is singly-resonant with only the desired signal wavelength $\omega_2$ oscillating in the cavity.

The present method is different from the parametric output couplers previously proposed in that the resonated wave $\omega_2$ sees a constant output coupling but multiple, sequential gain regions as the energy cascades downward from the original pump wavelength $\omega_3$ to longer wavelengths. The technique is stable against small detuning of the individual phase-matching regions, suffering only gradual gain reduction as detuning is increased. The cascade OPO of the present invention is well-suited for generation of wavelengths in the far infrared.

Requirements

The key to the proposed device is a non-linear medium 18 or several media which can be phase-matched for parametric conversion in multiple steps at progressively longer pump wavelengths. The possibilities include quasi-phase-matching, where the three waves are brought into phase by switching the sign of the k-vector mismatch once every coherence length, and continuous phase matching, where the three waves are kept in phase by angle or temperature tuning in a birefringent medium.

Quasi-phase-matching can be accomplished by stacking alternately oriented crystals, each one coherence length thick, or by periodic poling of a single crystal such as $LiNbO_3$ (PPLN). It can also be accomplished by total internal reflections (TIR) in a thin, high-index medium. Multiple regions within a single crystal can be achieved by poling with different periods in PPLN or by varying the thickness of the TIR medium. Continuous phase-matching requires that the pump $\omega_3$ and at least one of the generated waves have different polarizations, making use of the crystal birefringence to cancel the wavelength dependence of the optical index.

In a cascade OPO, the pump in each cascade level is the idler of the previous level while the signal is the same in all levels. Consequently, there are three possibilities for the relative polarizations: 1) the polarization of all three waves are the same, which requires quasi-phase-matching; 2) the polarization of the pump and the idler are the same and perpendicular to the signal; and 3) the polarization of the pump and idler are perpendicular to each other. The first two cases are suitable for a cascade in a single medium, while the last requires alternating media at each level, which is not desirable.

Design Examples

I. 3-Stage Generation of 4 $\mu$m from 1.064 $\mu$m

Figure 2:
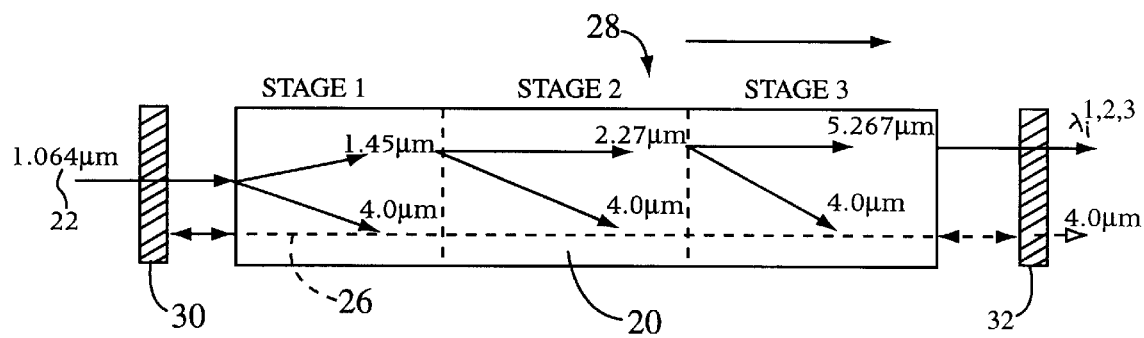
FIG. 2 is a graphical representation of a three-stage cascaded optical parametric oscillator of the present invention.

The basic configuration of a 3-stage cascade OPO of the present invention is shown in FIG. 2. A PPLN crystal 20 has three different regions with periods chosen to phase-match the transitions 1.064 $\mu$m to 1.45 $\mu$m, 1.45 to 2.274 $\mu$m and 2.274 to 5.267 $\mu$m. The desired wavelength which is resonated is 4 $\mu$m. The pump 22 and all generated waves are normal to the crystal face and to the c-axis.

The pump beam 22 at 1.064 $\mu$m is coupled into a resonator cavity 28 through an input mirror 30. The pump beam 22 comes into the resonator cavity 28 perpendicular to the crystal face 24 into stage 1 of the PPLN crystal 20. Stage 1 is phased-matched to produce an idler wave at 1.45 $\mu$m and a resonator wave 26 at 4.0 $\mu$m. The resonated wave 26 is oscillated within the resonator cavity 28 as it is reflected by both the input mirror 30 and partially reflected by the output mirror 32. Stage 2 of the PPLN crystal 20 is phase-matched to use the 1.45 $\mu$m idler wave of the previous region as a pump beam through stage 2. As a result, a second idler wave at 2.274 $\mu$m is produced along with a signal wave of 4.0 $\mu$m. Again, the signal wave 26 resonates within the cavity. The 2.274 $\mu$m idler wave then passes into stage 3 of the PPLN crystal 20 and is used as the pump beam for that stage. In this regard, an idler wave of 5.267 $\mu$m is produced as well as a 4.0 $\mu$m signal wave. The output mirror 32 is transparent to the resultant idler wave which allows the 5.267 $\mu$m wave to pass out of the oscillator cavity.

Figure 4:
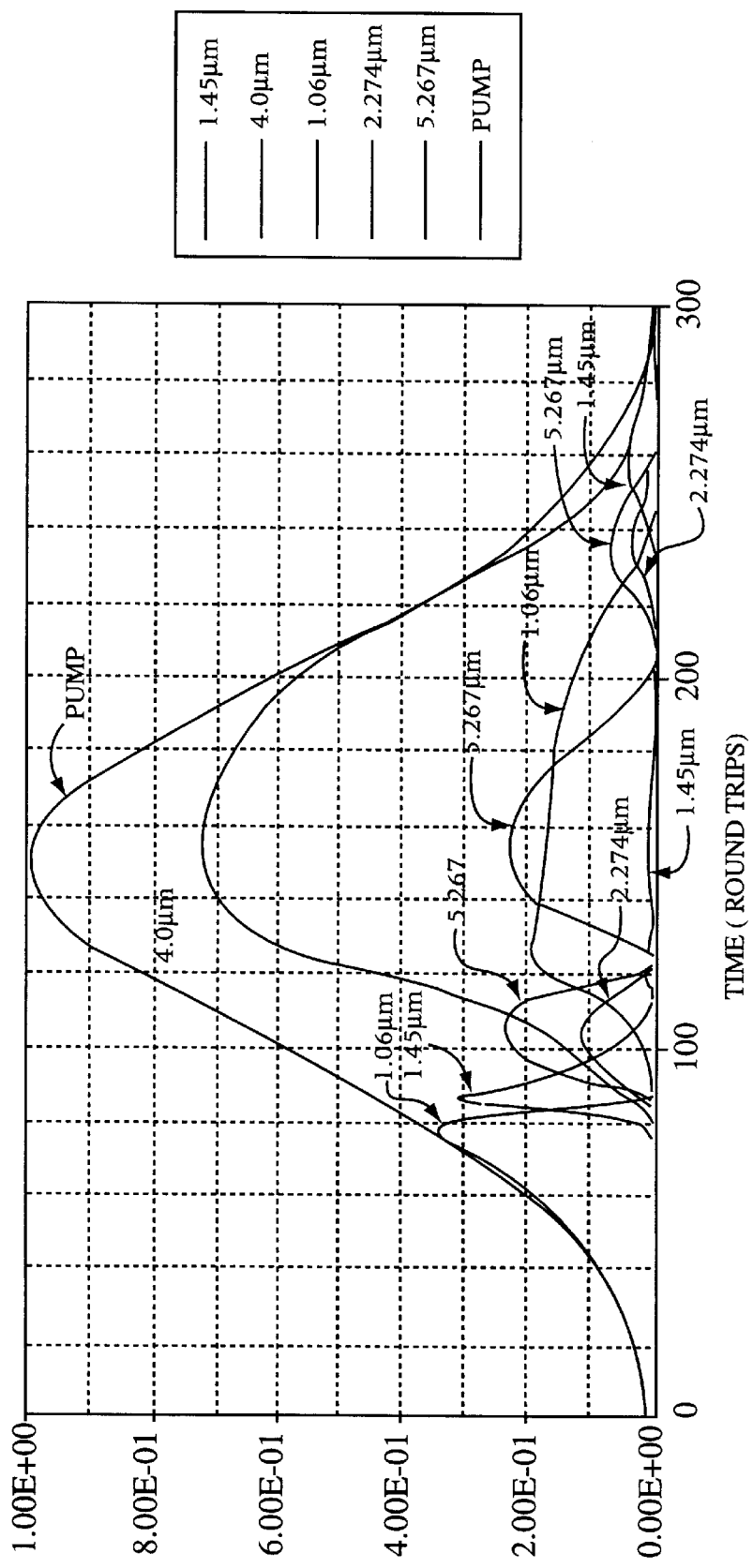
FIG. 4 is a graphical signal read-out charting various wavelengths of the three-stage cascaded optical parametric oscillator shown in FIG. 2.

A simulation of the output power at each wavelength of the device shown in FIG. 2 is presented in FIG. 4. The model assumes a Gaussian spatial beam shape for the pump 22 and resonated wave 26 and a Gaussian temporal pulse shape for the pump 22. About 70% of the pump energy is converted to 4 $\mu$m, which is 2.6 times as much as the maximum possible in a conventional OPO. Even higher efficiencies are possible with more tophat beams.

II. 7-Stage Generation of 8.5 $\mu$m from 1.064 $\mu$m

Figure 3:
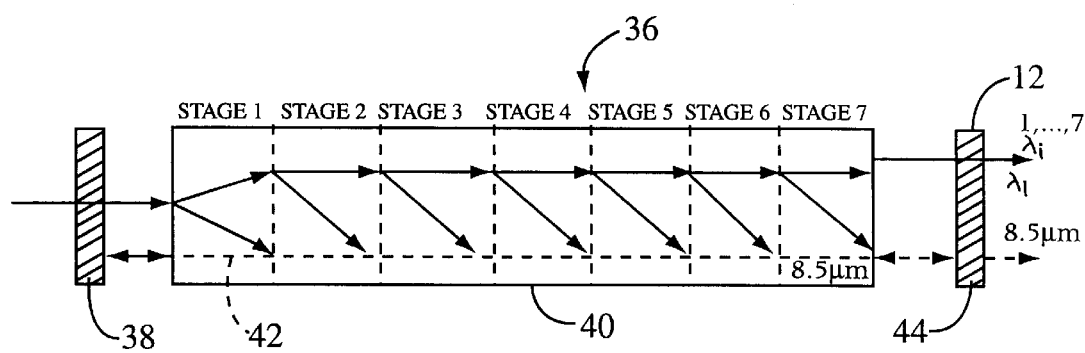
FIG. 3 is a graphical representation of a seven-stage cascaded optical parametric oscillator of the present invention.

Referring specifically to FIG. 3, there is shown an alternate embodiment of the present invention which comprises a seven-stage generation cascade optical parametric oscillator which produces an 8.5 $\mu$m resonated signal from the original 1.064$\mu$m pump beam. In operation, a pump beam 34 at 1.064 $\mu$m is coupled into a resonated cavity 36 through an input mirror 38. The pump beam 34 is perpendicular to the face of the first stage of the optical medium 40.

A wafer of ZnSe approximately 0.5 mm thick is used in a TIR geometry to achieve quasi-phase-matching for all the seven stages from 1.064 $\mu$m to 8.512 $\mu$m. The range of thickness required is from 524 $\mu$m to 552 $\mu$m with phase-matching being achieved on different orders for each transition.

At each stage of the optical medium 40, a signal and idler wave is produced. The idler wave at each stage is viewed as the pump beam which also produces a secondary idler and resonated wave. The resonated wave 42 is identical at the output of each stage and is resonated throughout the cavity at 8.5 $\mu$m. The output mirror 44 and input mirror 38 partially reflects and oscillates the signal wave 42 within the cavity 36. The resultant idler wave is passed through the output mirror 34 as the output mirror is transparent to all but the 8.5 $\mu$m resonated wave 42.

The medium 40 is transparent to much longer wavelengths and it should be possible to push the final wavelength out to 12 $\mu$m. Due to some absorption at 1.064 $\mu$m, however, it may be more efficient to start with a degenerate OPO and PPLN followed by a 3-stage ZnSe cascade OPO pumped at 2.128 $\mu$m.

Examples of OPO crystals of differing material that may be used with respect to the embodiments of the present invention include potassium titanyl phosphate ($KTiOPO_4$) and potassium or rubidium titanyl arsenate ($KTiOAsO_4$ or $RbTiOAsO_4$). These crystals use birefringent phase matching that involves a proper choice of propagation direction and polarization components. The birefringent phase matched materials for the infrared region include silver gallium selenide ($AgGaSe_2$), silver gallium sulfide ($AgGaS_2$), gallium selenide (GaSe), and zinc germanium phosphide ($ZnGeP_2$). Gallium arsenide (GaAs) and zinc selenide (ZnSe) are candidates for crystals based on quasi-phase matching, while periodically-poled lithium niobate (PPLN) crystals can be used for a quasi-phase matched OPO.

For birefringent crystals that require orthogonally polarized signal and idler components, the OPO crystal orientation and beam propagation are selected to satisfy that condition. For quasi-phase matched crystals with parallel polarization components, the OPO crystal must provide signal and idler components with parallel polarizations. The optimum combination of materials depend on the wavelengths of the pump, signal, and idler radiation.

Additional modifications and improvements of the present invention may also be apparent to those skilled in the art. Thus, the particular combination of the parts described and illustrated herein is intended to represent only one embodiment of the present invention, and is not intended to serve as limitations of alternative devices within the spirit and scope of the invention.

What is claimed is:

1. An optical parametric oscillator for down conversion of coherent light to longer wavelengths comprising:
   (a) an optical pump source for providing a pump beam at a primary wavelength;
   (b) a singly-resonant cavity having an input end and an output end;
   (c) a monolithic non-linear optical medium disposed in said cavity comprising at least two regions for sustaining optical parametric oscillation by producing an identical resonated signal frequency and a resultant idler frequency at each stage of the optical medium resulting in sequential gain of the resonated signal;
   (d) a reflective and transmissive input mirror, positioned at the input end of said cavity, for coupling the pump beam into the resonatant cavity and through the monolithic non-linear optical medium; and
   (e) a reflective and transmissive output mirror positioned at the output end of said cavity, adapted to couple the idler frequency external to the cavity, and further adapted to partially reflect and to oscillate the signal frequency within the resonatant cavity.

2. The optical parametric oscillator of claim 1 wherein said non-linear optical medium is a PPLN crystal with at least two distinct regions.

3. The optical parametric oscillator of claim 1 wherein said regions of said non-linear optical medium are phase-matched.

4. The optical parametric oscillator of claim 3 wherein continuous phase-matching is accomplished by angle tuning of the optical medium.

5. The optical parametric oscillator of claim 3 wherein continuous phase-matching is accomplished by temperature tuning of the optical medium.

6. The optical parametric oscillator of claim 3 wherein said crystal comprises PPLN.

7. The optical parametric oscillator of claim 1 wherein said regions of said non-linear optical medium are quasi-phase matched.

8. The optical parametric oscillator of claim 1 wherein said quasi-phase-matching is accomplished through the switching of the sign of the k-vector mismatch once every coherence length.

9. The optical parametric oscillator of claim 7 wherein each said region comprises alternately oriented crystals, one coherence length thick.

10. The optical parametric oscillator of claim 7 wherein said quasi-phase-matching is accomplished by periodic poling of a single crystal.

11. An optical parametric oscillator for down-conversion of coherent light to longer wavelengths comprising:
    (a) an optical pump for providing a pump beam at 1.064 $\mu$m;
    (b) a singly-resonant cavity having an input end and an output end;
    (c) a monolithic non-linear optical medium disposed in said cavity comprising three regions formed on a single substrate for sustaining optical parametric oscillation by producing an identical resonated signal frequency of 4.0 $\mu$m and a resultant idler frequency at each stage of the optical medium resulting in sequential gain of the 4.0 $\mu$m resonated signal;
    (d) a reflective and transmissive input mirror, positioned at the input end of said cavity, for coupling the pump beam into the cavity and through the monolithic non-linear optical medium; and
    (e) a reflective and transmissive output mirror positioned at the output end of said cavity, adapted to couple the idler frequency out of the cavity, and further adapted to partially reflect and oscillate the signal frequency within the cavity.

12. An optical parametric oscillator for down-conversion of coherent light to longer wavelengths comprising:
    (a) an optical pump source for providing a pump beam at 1.064 $\mu$m;
    (b) a singly-resonant cavity having an input end and an output end;
    (c) a monolithic non-linear optical medium disposed in said cavity comprising seven regions formed on a single substrate for sustaining optical parametric oscillation by producing an identical resonated signal frequency of 8.5 $\mu$m and a resultant idler frequency at each stage of the optical medium resulting in sequential gain of the resonated signal;
    (d) a reflective and transmissive input mirror positioned at the input end of said cavity, for coupling the pump beam into the resonant of cavity and through the monolithic non-linear optical medium; and
    (e) a reflective and transmissive output mirror positioned at the output end of said cavity, adapted to couple the idler frequency out of the cavity, and further adapted to partially reflect and to oscillate the signal frequency within the resonator cavity.

* * * * *